US012607860B2

(12) United States Patent
Bouchier et al.

(10) Patent No.: US 12,607,860 B2
(45) Date of Patent: Apr. 21, 2026

(54) SYSTEM COMPRISING AN OPTICAL DEVICE INTENDED TO BE WORN BY A USER AND A CALCULATION MODULE

(71) Applicant: Essilor International, Charenton-le-Pont (FR)

(72) Inventors: Aude Bouchier, Charenton-le-Pont (FR); Sarah Marie, Charenton-le-Pont (FR); Jessica Combier, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 18/846,494

(22) PCT Filed: Mar. 13, 2023

(86) PCT No.: PCT/EP2023/056341

§ 371 (c)(1),
(2) Date: Sep. 12, 2024

(87) PCT Pub. No.: WO2023/186509

PCT Pub. Date: Oct. 5, 2023

(65) Prior Publication Data

US 2025/0189799 A1 Jun. 12, 2025

(30) Foreign Application Priority Data

Mar. 28, 2022 (EP) .................................... 22305381

(51) Int. Cl.
*G02B 27/01* (2006.01)
(52) U.S. Cl.
CPC ..... *G02B 27/0172* (2013.01); *G02B 27/0179* (2013.01); *G02B 2027/0118* (2013.01); *G02B 2027/014* (2013.01); *G02B 2027/0178* (2013.01); *G02B 2027/0187* (2013.01)

(58) Field of Classification Search
CPC ............ G02B 27/0172; G02B 27/0179; G02B 2027/0118; G02B 2027/014; G02B 2027/0178; G02B 2027/0187
See application file for complete search history.

(56) References Cited

U.S. PATENT DOCUMENTS

| | | | |
|---|---|---|---|
| 11,237,628 B1 | 2/2022 | Sharma et al. | |
| 2016/0187652 A1* | 6/2016 | Fujimaki ............ | G02B 27/0172 345/8 |
| 2020/0035031 A1* | 1/2020 | Konings ................ | G02B 30/00 |
| 2022/0044489 A1 | 2/2022 | Konings et al. | |

OTHER PUBLICATIONS

International Search Report issued on Jun. 13, 2023 in PCT/EP2023/056341 filed on Mar. 13, 2023, 3 pages.

* cited by examiner

*Primary Examiner* — Brent D Castiaux
(74) *Attorney, Agent, or Firm* — Oblon, McClelland, Maier & Neustadt, L.L.P.

(57) ABSTRACT

A system that includes an optical device intended to be worn by a user and a calculation module. The optical device includes a light sensor, the light sensor being located in an internal side of the optical device and in a vicinity of a front part of the optical device, the light sensor being configured to determine an amount of light that it receives, and the calculation module being configured to determine an amount of backlight received by the optical device using the amount of light received by the light sensor.

18 Claims, 8 Drawing Sheets

[Fig. 11]
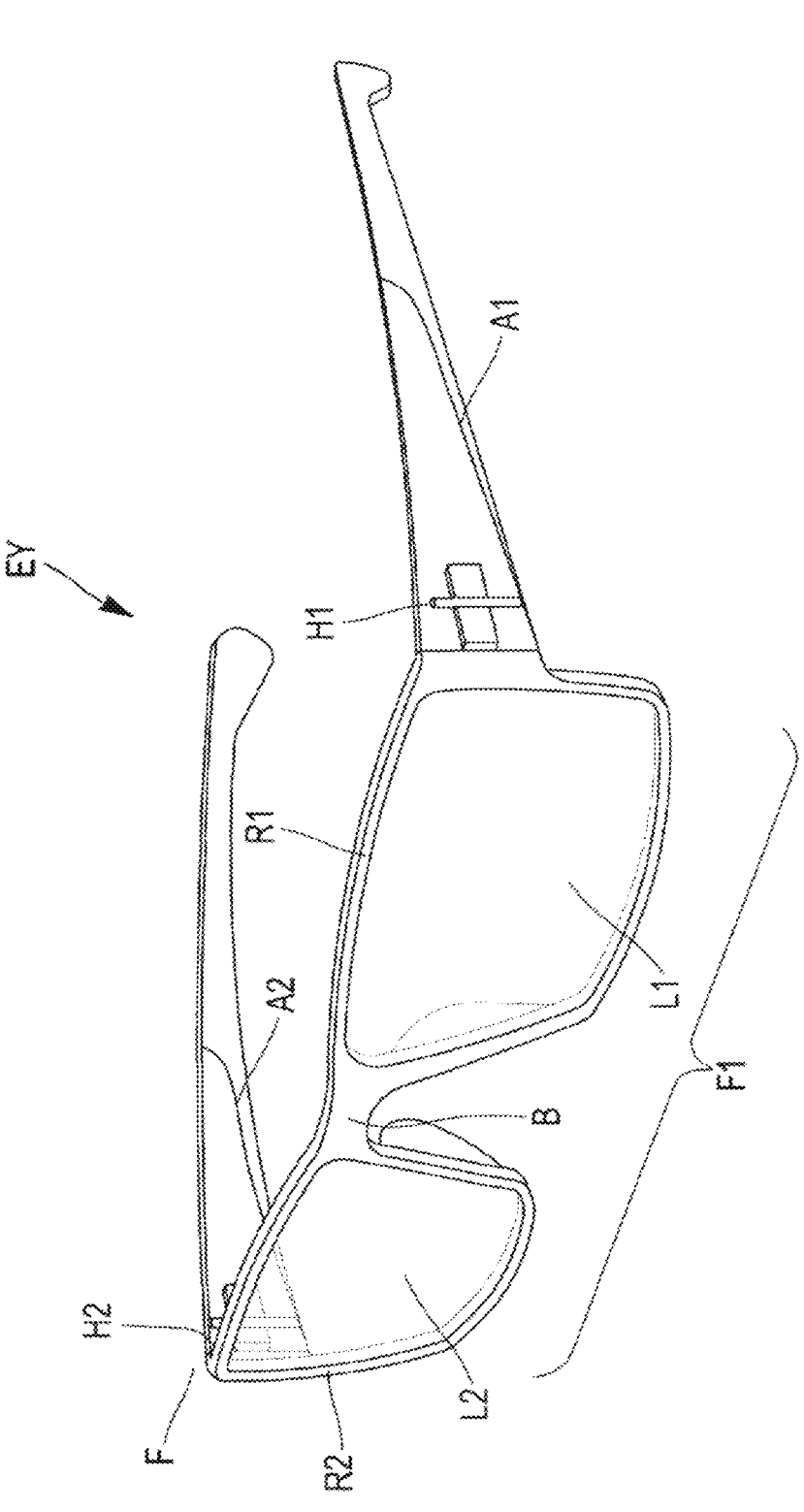

[Fig. 2]
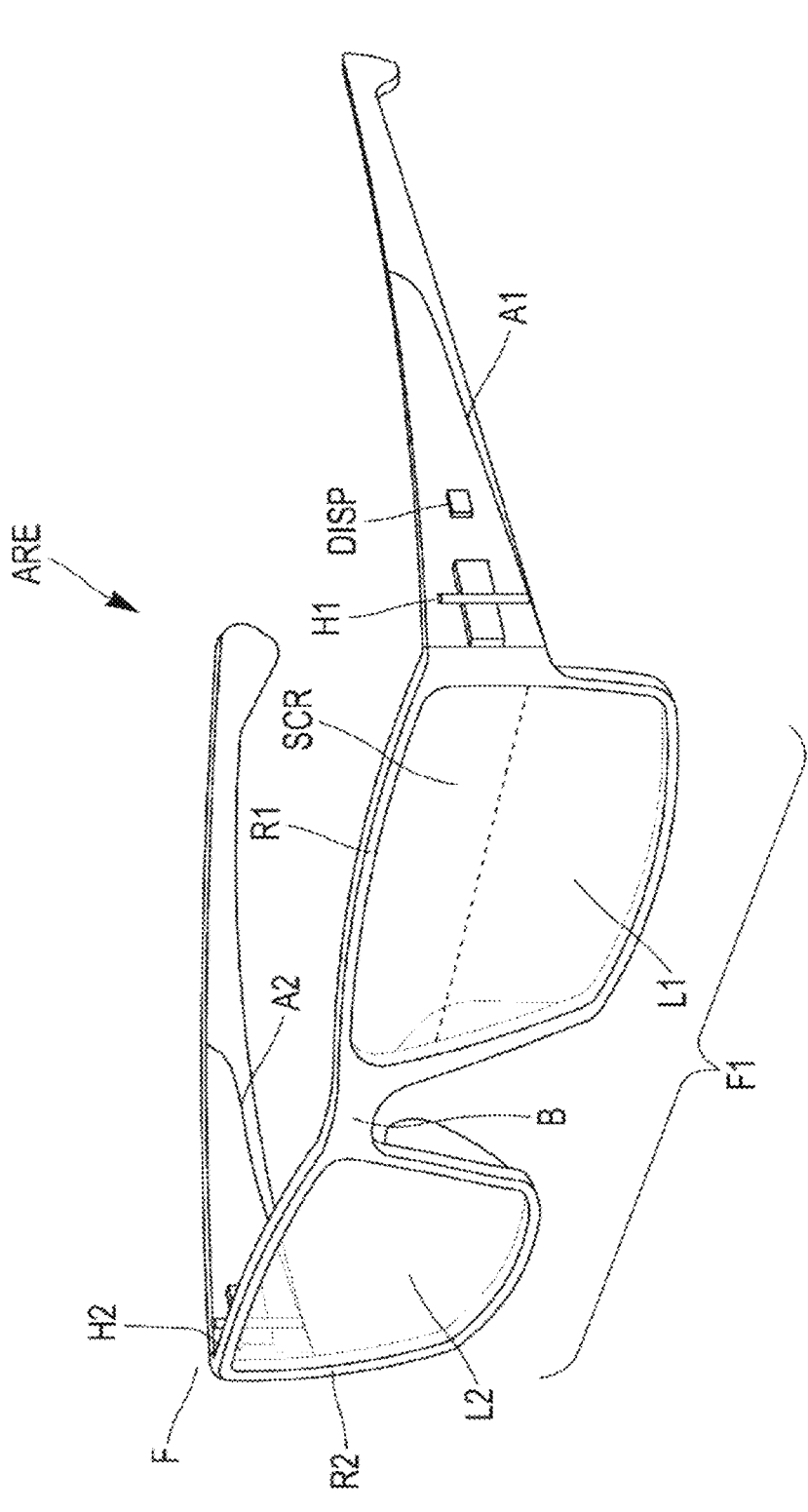

[Fig. 3]
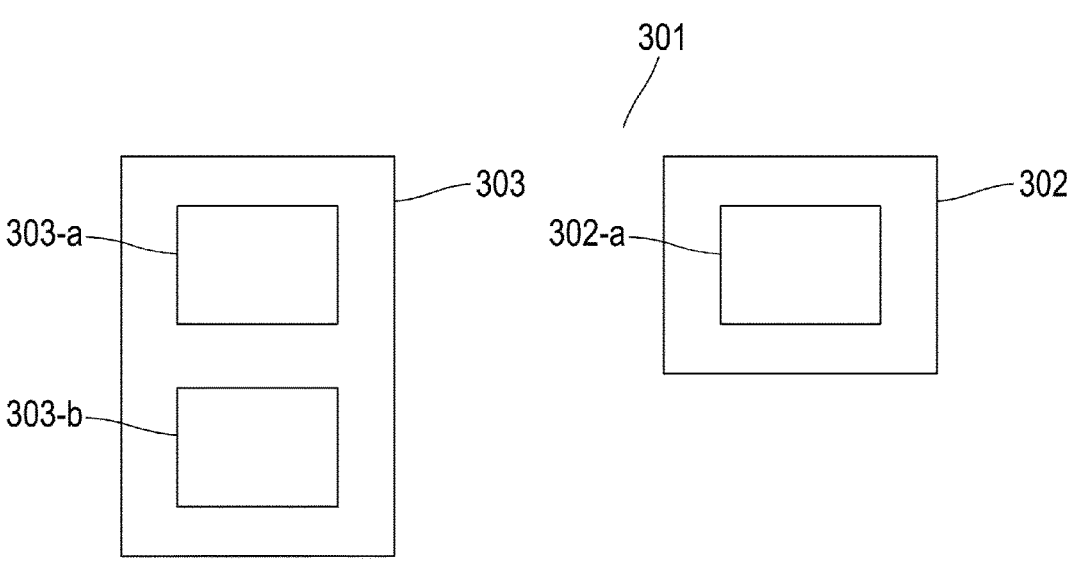

[Fig. 4]
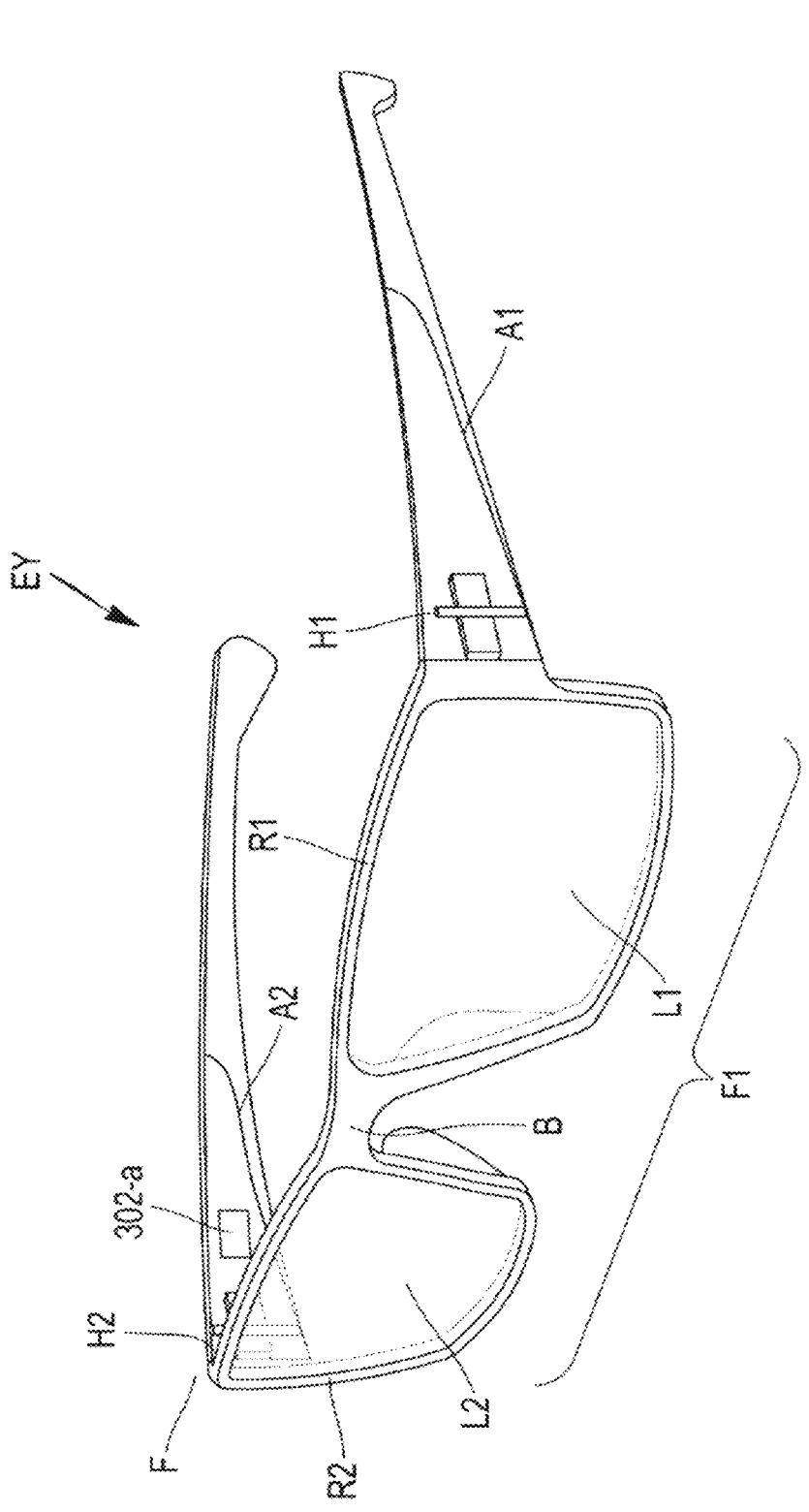

[Fig. 5a]
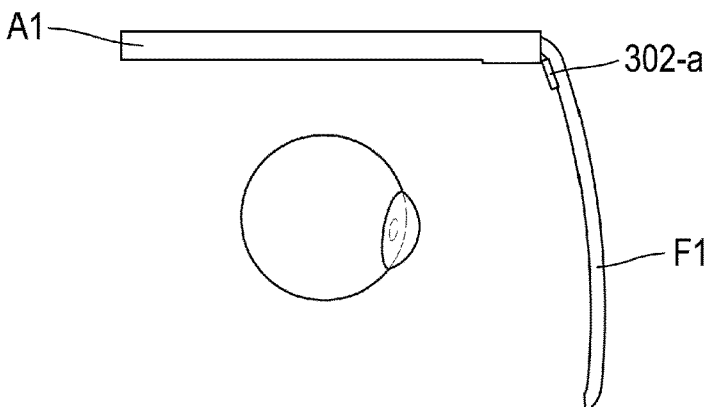
[Fig. 5b]
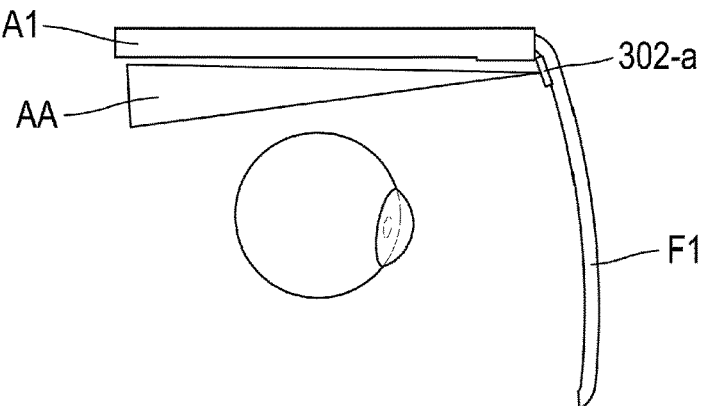
[Fig. 5c]
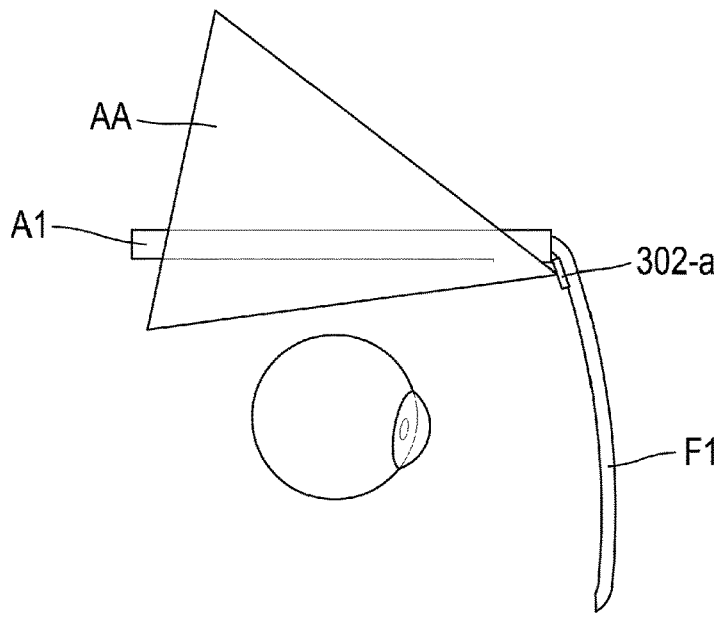

[Fig. 6]
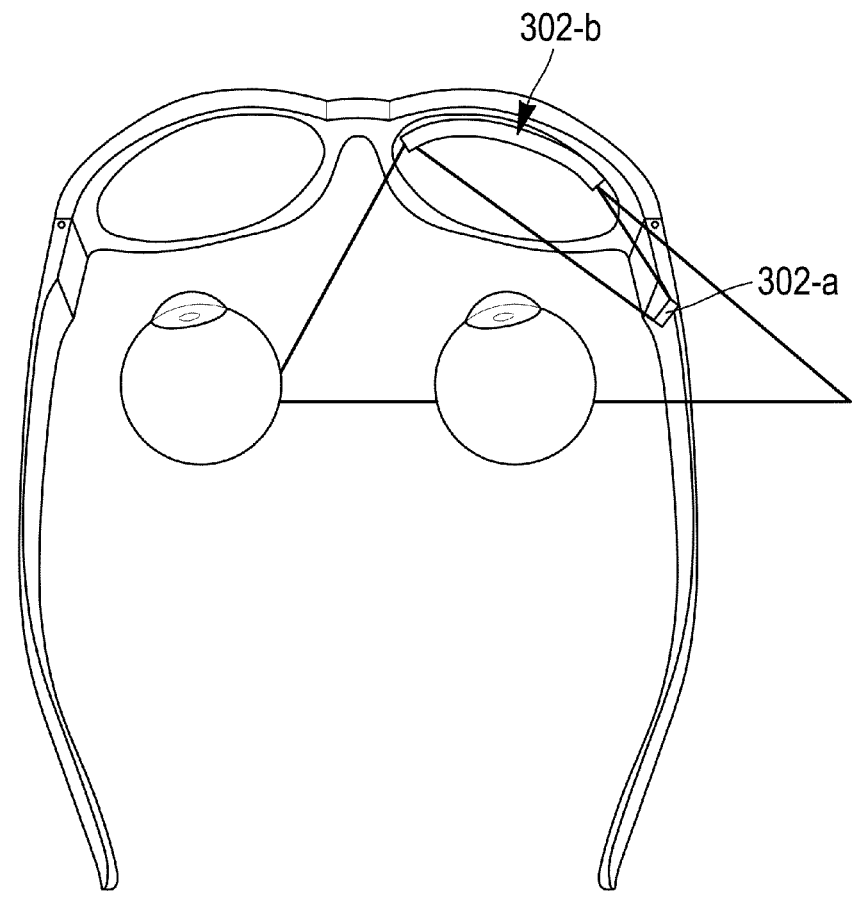

[Fig. 7a]
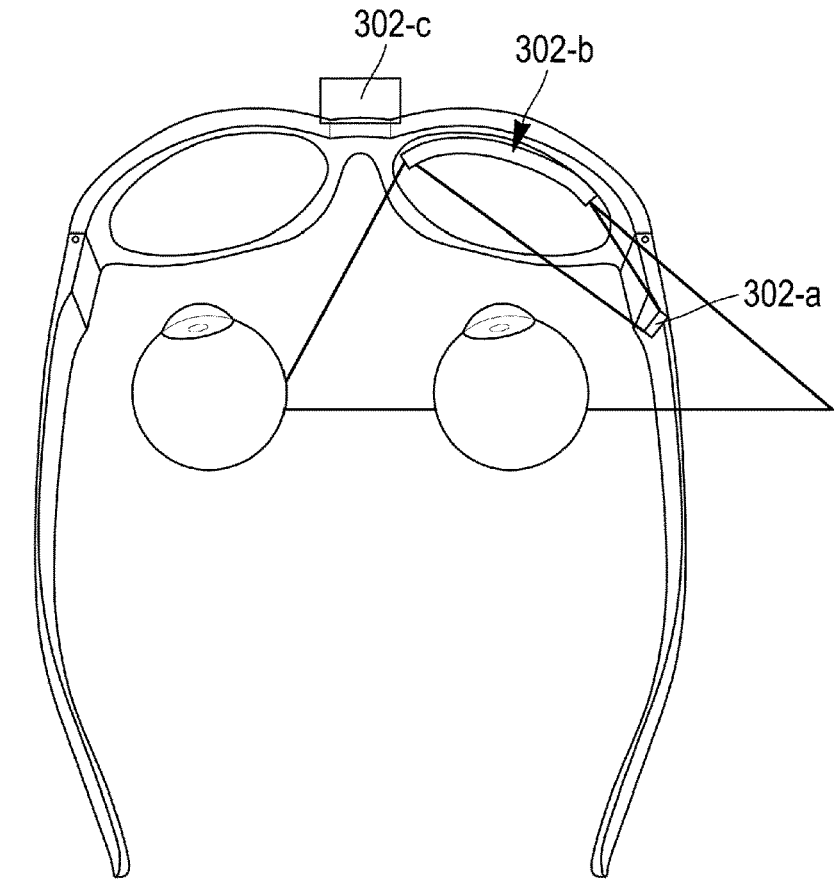
[Fig. 7b]
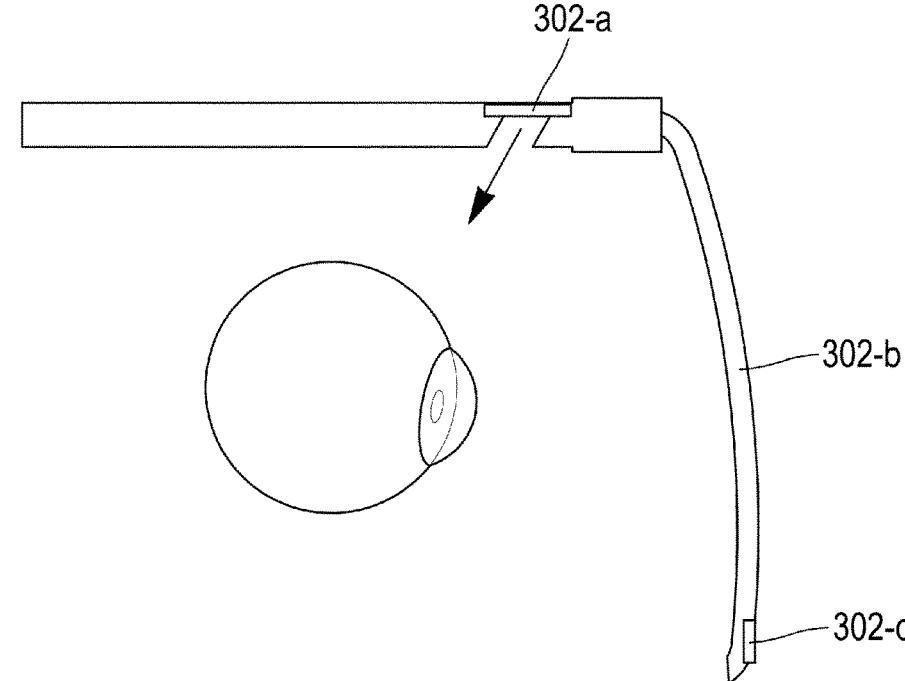

[Fig. 8]
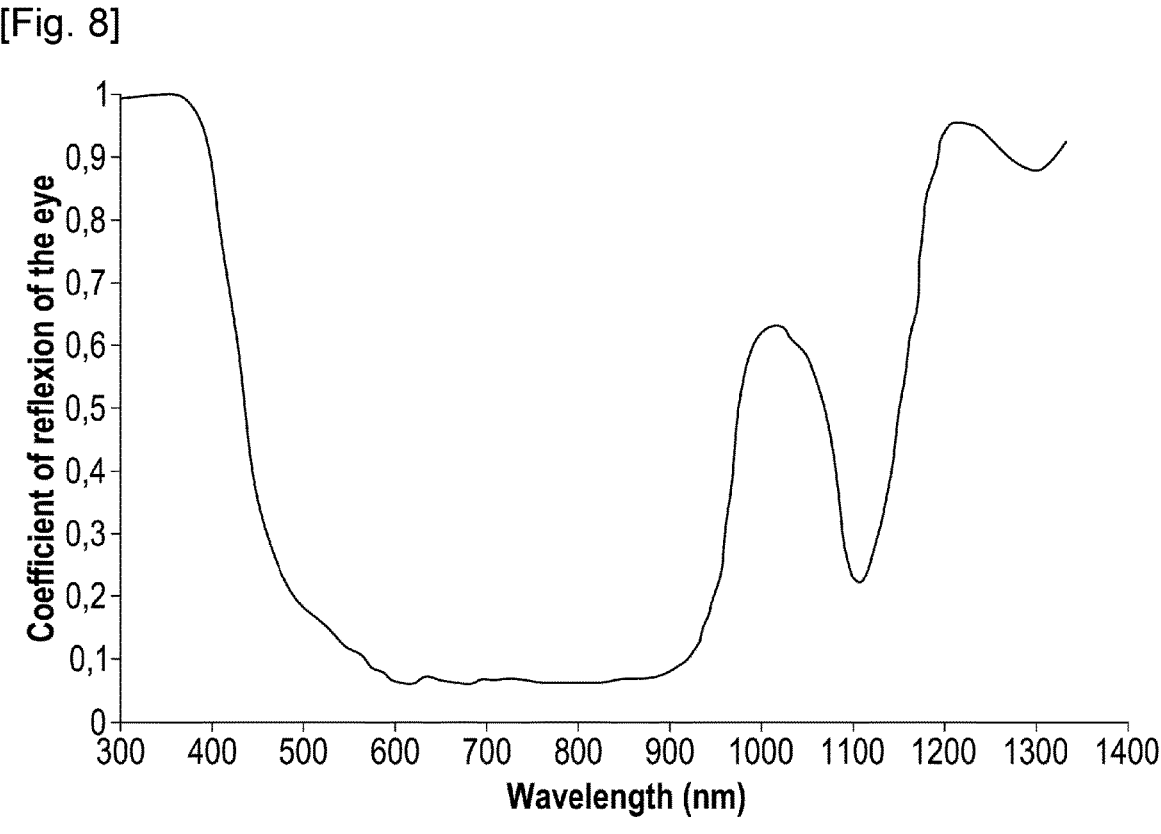
[Fig. 9]
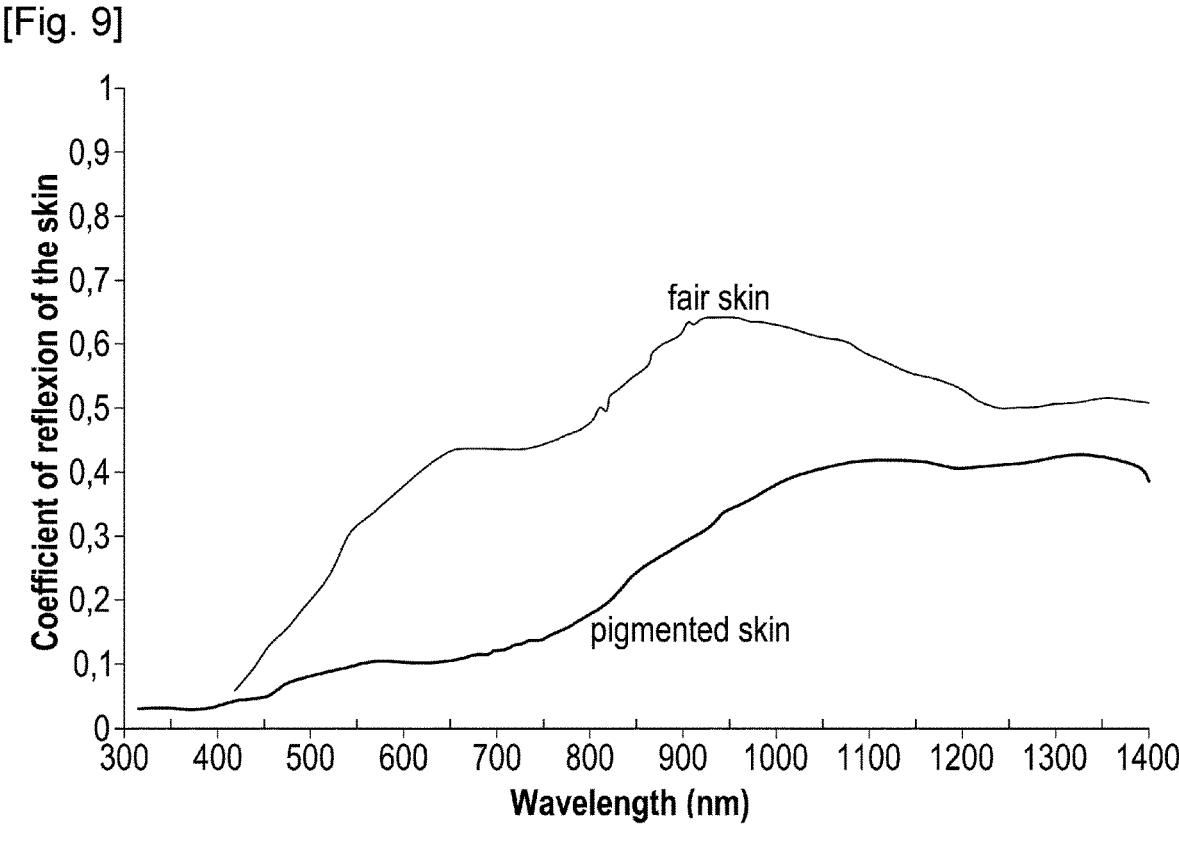

SYSTEM COMPRISING AN OPTICAL DEVICE INTENDED TO BE WORN BY A USER AND A CALCULATION MODULE

FIELD

Various aspects of this disclosure generally relate to the field of the determination of an amount of backlight received by an optical device.

BACKGROUND

The backlight is the light coming from the back of the user when the user is wearing the optical device. This backlight must be taken into account to configure different functions of the optical devices.

The FIG. 1 represents eyeglasses EY, which is an example of an optical device. Eyeglasses are also known as eyewear. These eyeglasses EY comprise two lenses L1 and L2 and a frame F. The frame F comprises two arms or temples A1 and A2 and a front part F1. The front part F1 comprises a right rim R1 and left rim R2 linked together by a bridge B. The front part F1 and the two arms A1 and A2 are linked using two hinges H1 and H2. The hinges H1 and H2 allow the user to fold the arms A1 and A2 along the front part F1. The rims R1 and R2 of the frame F1 are configured to receive and to maintain the lenses L1 and L2. One or both of the lenses L1 or L2 can be an electrochromic lens or an lens comprising an active holographic filter on which the transmission or the reflection can be controlled.

The FIG. 2 represents augmented reality eyeglasses ARE, which is another example of an optical device. These augmented reality eyeglasses ARE comprise also two lenses L1 and L2 and a frame F. The frame F comprises two arms or temples A1 and A2 and a front part F1. The front part F1 comprises a right rim R1 and left rim R2 linked together by a bridge B. The front part F1 and the two arms A1 and A2 are linked using two hinges H1 and H2. The hinges H1 and H2 allow the user to fold the arms A1 and A2 along the front part F1. The rims R1 and R2 of the frame F1 are configured to receive and to maintain the lenses L1 and L2. (Furthermore, the augmented reality eyeglasses ARE comprise a display SCR, generally a see-through display or transparent display.) Furthermore, the augmented reality eyeglasses ARE comprise a display SCR to generate an image. The display is generally placed in one arm A1 or A2 or the both arms A1 and A2. It can be an emissive display like OLED, µLED, LCD display, or a smart display using a SLM (Spatial Light Modulator) and lasers or LEDs, or a LFD (Light Field Display), or a retinal projection display based on MEMS and lasers. The image generated by the display is then brought to the lens L1 or L2 or L1 and L2 and to the user thanks to waveguides or reflection on the lens L1 or L2 or the two lenses L1 and L2. In the case of the use of a waveguide, the virtual image has to be extracted from the waveguide to be seen by the user. This device SCR can be partially reflective plates in the lens, or diffractive optics (gratings for example) or diffusive dots placed in the lens. In the case of direct reflection on the lens, the support SCR can be partially reflective plates in the lens, diffractive optics or structuration of the lens, or a holographic mirror, which is potentially an active holographic mirror. The display DISP can also be a near-eye display, or could be a transparent display placed directly on the lens L1 or L2. In this case the support SCR is the same object as the display DISP.

The tint intensity or the amount of reflection of the electrochromic lens can be modified relatively to ambient light and mainly light coming from the front of the wearer. Nevertheless, a part of the light can come from the back of the wearer, for example, in case of absence or degradation of anti-reflective coatings on the lenses or with electrochromic and/or holographic mirror lenses. This light can also influence the user's vision, mainly when the electrochromic lenses are dark. It is thus interesting to measure the backlight to manage the electrochromic lens correctly.

Regarding augmented reality eyeglasses ARE, the backlight may reflect on the lens (L1 or L2). This reflection is especially problematic for augmented reality eyeglasses with a design close to standard eyewear and thin arms. Therefore, this backlight will have the effect of limiting the virtual image contrast. Furthermore, providing a virtual image with high intensity will cause a high electrical consumption and potentially eye security. It is thus interesting to measure the backlights to correctly manage the intensity of the images displayed on the display DISP of the augmented reality eyeglasses ARE.

The parameterisation of the display DISP of the augmented reality eyeglasses ARE or the electrochromic lens or the active holographic mirror of the eyeglasses EY will depend on the amount of backlight received therefore there is a need for a system comprising an optical device configured to determine the amount of backlight received.

SUMMARY

The following presents a simplified summary in order to provide a basic understanding of various aspects of this disclosure. This summary is not an extensive overview of all contemplated aspects and is intended to neither identify key or critical elements of all aspects nor delineate the scope of any or all aspects. The sole purpose is to present some concepts of one or more aspects in a simplified form as a prelude to the more detailed description that is presented later.

One aspect of this disclosure is a system. This system comprises an optical device intended to be worn by a user and a calculation module. The optical device comprises a light sensor, the light sensor is located in an internal or inner side of the optical device and in a vicinity of a front part of the optical device, the light sensor is configured to determine an amount of light that it receives, the calculation module is configured to determine an amount of backlight received by the optical device using the amount of light received by the light sensor.

DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIG. 1 represents the eyeglasses.

FIG. 2 represents the augmented reality eyeglasses.

FIG. 3 represents a system comprising an optical device and a calculation module.

FIG. 4 represents another embodiment of the eyeglasses.

FIGS. 5-*a* to 5-*c* represent other embodiments of the eyeglasses.

FIG. 6 represents an embodiment of the optical device.

FIGS. 7-*a* and 7-*b* represent two embodiments of the optical device.

FIG. 8 represents the spectrum of reflection of an eye.

FIG. 9 represents the spectrum of reflection of skin

DETAILED DESCRIPTION OF EMBODIMENTS

The detailed description set forth below in connection with the appended drawings is intended as a description of various possible embodiments and is not intended to represent the only embodiments in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

FIG. 3 represents a system 301 comprising an optical device 302 and a calculation module 303.

The optical device 302 can be eyeglasses EY or augmented reality eyeglasses ARE. The calculation module 303 can be an independent module, for example, a smartphone or a computer. The calculation module 303 can also be a virtual machine located on a cloud network or a server not co-located with the user of the system 301. The calculation module 303 can also be included in the optical device 302.

The calculation module 303 comprises a memory 303-*a* and a processor 303-*b*.

Examples of processors 303-*b* include microprocessors, microcontrollers, graphics processing units (GPUs), central processing units (CPUs), application processors, digital signal processors (DSPs), reduced instruction set computing (RISC) processors, systems on a chip (SoC), baseband processors, field-programmable gate arrays (FPGAs), programmable logic devices (PLDs), state machines, gated logic, discrete hardware circuits, and other suitable hardware for example ASICs (Application-Specific Integrated Circuits) configured to perform the various functionality described throughout this disclosure.

The memory 303-*a* is computer-readable media. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by the processor 303-*a* of the calculation module 303.

The optical device 302 can comprise a light sensor 302-*a* advantageously two light sensors 302-*a*.

The light sensor 302-*a* is for example a camera, a video luminance meter, a photodetector, a photodiode, an Ambient Light Sensor ALS, a mini spectrometer or a limited wavelength range sensor in visible range with bandwidth from 5 to 400 nm or more.

The camera has the advantage of bringing information such as light intensity/colour/positions of backlight sources. The other types of light sensor 302-*a* have the advantage of being more efficient regarding energy management.

The optical device 302 can also comprise an eye tracker module or eye tracker. This eye tracker allows the determination of the gaze axis of the user.

The calculation module 303 is configured to determine an amount of backlight received by the optical device 302 using the amount of light received by the light sensor 302-*a*.

The calculation module 303 can also be configured to determine from the amount of backlight received by the optical device 302 the amount of backlight lightening the eye of the user thanks to the knowledge of the reflection coefficient of the internal side of the lens L1 or L2.

FIG. 4 represents the eyeglasses EY with the light sensor 302-*a* located in an internal side of the optical device 302 and in a vicinity of a front part F1 of the optical device 302. More precisely, in this embodiment, the light sensor 302-*a* is located in the right arm A2 and is close to the right hinge H2. The light sensor 302-*a* is configured to view the face of the user when the optical device 302 is worn by the user. In other embodiments, with a specific optical device in front of the sensor 302-*a*, this sensor can directly measure the backlights. This specific optical device can be a prism or a holographic deflector for example.

In another embodiment, represented in FIG. 5-*a*, the light sensor 302-*a* is located in an internal side of the front part F1 or on the lens L1 or L2 of the optical device 302. The internal side of the front part F1 is the side of the front part F1 facing the user when the user is wearing the optical device 302.

The FIGS. 5-*b* and 5-*c* represent, in two different embodiments, a field of view of the light sensor 302-*a*. The field of view can be defined by a solid angle of measurement or acceptance angle AA of the light sensor 302-*a*.

The acceptance angle AA of the light sensor and a direction of detection of the light sensor 302-*a* is configured such that the light sensor 302-*a* mostly receives backlight.

In an embodiment, the acceptance angle AA is between 5° and 90° more precisely between 20° and 70°.

In other words, one way to measure the back-lightening of the optical device 302 is to use the light sensor 302-*a* placed in the frame F, for example, in the front part F1 of the frame F or near the hinge H1 or H2, or eventually on one of the lenses L1 or L2. When the light sensor 302-*a* is placed on one of the lenses L1 or L2 it can for example be a chip-on-lens sensor. Furthermore, this light sensor 302-*a* can be oriented toward the back of the optical device 302.

The measured backlight will depend on the acceptance angle AA of the light sensor 302-*a*. If the acceptance angle AA is large, the measured light will probably come from the back but also from the front, the top and the bottom of the wearer. The light coming from the front, the top and the bottom is unwanted light in terms of measurement. So, a solution is to reduce the acceptance angle AA of the light sensor 302-*a* to measure only the backlight. For example, in FIG. 5-*b* the acceptance angle AA is smaller than in FIG. 5-*c* and so in FIG. 5-*b* the light sensor 302-*a* receives mostly backlight.

Having a large acceptance angle AA (see FIG. 5-*c*) is however useful if lights or backlights are in the range of input directions that can be reflected by the lens toward eyes of the user. The acceptance angle AA of the light sensor 302-*a* will then depend on the characteristics of the frame F (pantoscopic tilt, wrap tilt, size of the lenses, and so on). The angle of acceptance AA should be between 20° ($0.06 \times 2\pi$ steradian (sr), low solid angle) and 90° ($2\pi$ steradian (sr), large solid angle) to collect the whole backlights. Having a large acceptance angle AA is advantageous when the eye is mobile in front of the lens.

In an embodiment, the light sensor 302-*a* can have a variable acceptance angle AA to measure just one direction with a low angle, to only have the backlight and then another direction with a different angle, generally larger.

In another embodiment in which the optical device 302 comprises two light sensors 302-*a*, the two light sensors 302-a have a different acceptance angle AA. One acceptance angle AA is narrow and the other acceptance angle AA is wide.

In this embodiment, the gaze axis of the user can be determined using the eye tracker and a point of the lens L1 or L2 crossed by this gaze axis is determined.

In an embodiment presented FIG. 6 the optical device 302 can also comprise a reflecting part 302-b. As presented in FIG. 6 the reflecting part 302-b can be localized in an internal side of the front part F1 of the optical device 302 or on one of the lenses L1 or L2.

The reflecting part 302-b is configured to reflect the backlight. A field of view of the light sensor 302-a being configured to match with the reflecting part 302-b.

The field of view of the light sensor 302-a matches with the reflecting part 302-b when this field of view covers at least 90% of the reflecting part, and the part of the field of view not covering the reflecting part is less than 10% of the whole field of view.

This reflecting part 302-b can be an active or passive holographic mirror configured to reflect at least one frequency of the light, on a bandwidth larger than 2 nm, for example a bandwidth comprised between 5 and 20 nm. The light sensor 302-a is configured to determine the amount of light it receives on only the at least one frequency.

Active holographic mirrors are described in the PCT application reference WO2017005608A1. The holographic mirrors can be based on metasurfaces. The change of characteristics of the active holographic mirror can be a change of reflection efficiency (through the visibility of the recorded fringes of refractive indices in the material), of spectral characteristics (through the expansion or compression of the holographic material to change the distance between fringes).

In an embodiment, the reflecting part 302-b can be a part of one of the lenses L1 or L2. This part of the lens L1 or L2 can be a holographic mirror for few visible wavelengths and small bandwidths, and it will cover just a small part of the lens. It can also be a holographic Near Infrared (NIR) mirror. In this case, the mirror can cover all or part of the concave side of the lens without disturbing the vision of the user. The physical characteristics of the reflecting part 302-b and how the backlight is determined can also depend on the angular characteristics of the backlight (directions, solid angles) and the position of the light sensor 302-a. The concave side of a lens is the internal side of the lens, in other words the side of the lens facing the user when the user is wearing the optical device 302.

In other words, in this embodiment, to measure backlight, we can measure the light directly reflected by a part of the front part F1 of the optical device 302, for example, by one the lenses L1 or L2. In this embodiment, the light sensor 302-a can be a low resolution camera placed in the arm A1 or A2 of the frame F1 and with a field of view in the direction of the reflecting part 302-b. A calibration linked to the level of transmission of the electrochromic lens or the tinted lens can be used to know the level of front light transmitted by the lens L1 or L2 located close to the reflecting part 302-b. This calibration can take into account the difference of position between the eye and the light sensor 302-a to obtain the amount of backlight entering in the eye of the user. The calibration of the reflection can be realized by taking into account the reflection coefficient and spectrum of the lens, if needed, and the geometrical characteristics of the configuration.

In an embodiment, the reflecting part 302-b has a controllable reflection coefficient. The light sensor 302-a is configured to determine:
- a first amount of light received when the reflecting part 302-b has a first reflection coefficient and
- a second amount of light received when the reflecting part 302-b has a second reflection coefficient, The first reflection coefficient is different from the second reflection coefficient.

The calculation module 303 or the optical device 302 are also configured to subtract the first amount of light received by the light sensor 302-a and the second amount of light received by the light sensor 302-a.

In an embodiment, the optical device 302 comprises a second reflecting part. The reflection coefficient of the first reflecting part is different from the reflection coefficient of the second reflecting part.

The optical device 302 or the calculation module 303 are configured to determine:
- a first amount of light received when the field of view of the light sensor 302-a or of the two light sensors 302-a is matching the first reflecting part and
- a second amount of light when the field of view of the light sensor 302-a or of the two light sensors 302-a is matching the second reflecting part, or
- a subtraction of the first amount of reflected light and the second amount of reflected light, In both previous embodiments, the light received by the light sensor 302-a comprises reflected backlight and transmitted front light.

$$P\_R1 = P\_Trans + Refl1 * P\_Back$$

$$P\_R2 = P\_Trans + Refl1 * P\_Back$$

Where:
- P_R1 is the amount of light received by the first light sensor 302-a with the first reflection coefficient
- P_R2 is the amount of light received by the first light sensor 302-a with the second reflection coefficient
- Refl1 is the first reflection coefficient
- Refl2 is the second reflection coefficient
- P_Trans is the amount of front light reaching the first light sensor 302-a
- P_Back is the amount of backlight Using this model, the calculation module 303 or the optical device 302 can determine the amount of backlight using the following equation:

$$P\_Back = (P\_R1 - P\_R2)/(Refl1 - Refl2)$$

When the two measurements of the light are not taken simultaneously, are taken using two different light sensors, the transmission of the two reflecting areas are different, or changes with its reflection:
- the amount of front light reaching the first light sensor 302-a during the first measurement (P_Trans_1) can be different from the amount of front light reaching the first light sensor 302-a during the second measurement (P_Trans_2) or
- the amount of front light reaching the first light sensor 302-a (P_Trans_1) can be different from the amount of front light reaching the second light sensor 302-a (P_Trans_2)

In this Case:

$$P\_R1 = P\_Trans\_1 + Refl1 * P\_Back$$

$$P\_R2 = P\_Trans\_2 + Refl2 * P\_Back$$

Using this model, the calculation module 303 or the optical device 302 can determine the amount of backlight using the following equation:

$$P\_Back = (P\_R1 - P\_Trans1 - P\_R2 + P\_Trans2)/(Refl1 - Refl2)$$

In an embodiment, the optical device 302 has an electrochromic lens with a controllable transmission coefficient. The optical device is configured to take a first measure of the amount of light received by the sensor when the lens has a first transmission coefficient and a second measure when the lens has a second transmission coefficient. The first transmission coefficient is different from the second transmission coefficient.

In this Case:

$$P\_R1 = P\_Front * Trans\_1 + Refl * P\_Back$$

$$P\_R2 = P\_Front * Trans\_2 + Refl * P\_Back$$

Where
P_Front is the amount of front light
Trans_1 is the first transmission coefficient transmission of the lens (L1 or L2) in the vicinity of the first light sensor 302-*a*
Trans 2 is the second transmission coefficient transmission of the lens (L1 or L2) in the vicinity of the first light sensor 302-*a*
Refl is the is the reflection coefficient of the reflecting part reflecting the backlight toward the first light sensor 302-*a*

In this embodiment the optical device 302 or the calculation module 303 is configured to use the following equation:

$$P\_Back = (P\_R1 * Trans\_2 - P - R2 * Trans\_1)/(Refl * (Trans\_2\_Trans\_1))$$

In other words the optical device 302 or the calculation module 303 are also configured to determine the backlight by subtracting the first measurement and the second measurement. The calculation module 303 is configured to determine the amount of backlight using the first amount of reflected light, the second amount of reflected light and/or the subtraction.

In other embodiments, the field of view of the light sensor 302-*a* is configured to match with a part of the face of the user or for example a part of the skin of the face or the eye of the user. In these embodiments, the light sensor 302-*a* determines the light reflected by the skin or the eye of the user. The eye and the skin are generally lightened by the light coming from the front and the back of the user. Generally, the skin or the eye is not illuminated by light coming from the top or the bottom. This embodiment allows a better integration of the different elements (light sensors, reflecting parts) in the eyeglasses.

As illustrated in FIG. 7-*a*, the optical device 302 comprises a second light sensor 302-*c*. This second light sensor 302-*c* is located in the front part F1 of the frame F and with a field of view toward the front of the user to determine an amount of front light received by the optical device 302.

The second light sensor 302-*c* can also be placed directly on the convex (external) side of the lens, or on the concave (internal) side of the lens and oriented toward the convex side of the lens to directly measure the transmitted light.

Using the amount of light received by the second light sensor 302-*c*, the optical device 302 or the calculation module 303 can determine an amount of the light transmitted by the lens (L1 or L2) in the vicinity of the first light sensor 302-*a*. For example, if the first light sensor 302-*a* is located in the right arm, the optical device 302 or the calculation module 303 can determine an amount of the light transmitted by the right lens. The optical sensor device 302 or the calculation module 303 can use the following equation:

$$P\_Trans = P\_Front * Trans$$

Where:
P_Trans is the amount of front light reaching the first light sensor 302-*a*
P_Front is the amount of front light reaching the second light sensor 302-*c*
Trans is the transmission coefficient of the lens in the vicinity of the first light sensor 302-*a*
The light received by the light sensor 302-*a* comprises reflected backlight and transmitted front light.

$$P\_R = P\_Trans + Refl * P\_Back$$

where:
P_Trans is the amount of front light reaching the first light sensor 302-*a*
P_R is the amount of light received by the first light sensor 302-*a*
Refl is the reflection coefficient of the reflecting part 302-*b* reflecting the backlight toward the first light sensor 302-*a*
P_Back is the amount of backlight
The calculation module 303 is configured to determine the backlight by multiplying the amount of front light received by a transmission coefficient of the lens of the optical device and by subtracting the multiplication to the amount of light received by the first light sensor 302-*a*. The calculation module 303 or the optical device 302 can be configured to use the following equations:

$$P\_Back = (P\_R - P\_Trans)/Refl \text{ or}$$

$$P\_Back = (P\_R - P\_Front * Trans)/Refl$$

Where:
P_Trans is the amount of front light reaching the first light sensor 302-*a*
P_R is the amount of light received by the first light sensor 302-*a*

P_Front is the amount of front light reaching the second light sensor 302-c

Trans is the transmission coefficient of the lens in the vicinity of the first light sensor 302-a Refl is the reflection coefficient of the reflecting part reflecting the backlight toward the first light sensor 302-a P_Back is the amount of backlight.

In other words, in this embodiment, the amount of light received by the first light sensor 302-a comprises the backlight but also other disturbing lights, more precisely the front light. Using the second light sensor 302-c we can determine the amount of front light. Knowing the transmission coefficient of the lens and potentially the reflection coefficient of the reflecting part 302-b, we can determine the amount of front light received by the first light sensor 302-a. As presented before the first light sensor 302-a receives:

the front light transmitted by the lens and the back light reflected on the reflecting part 302-b.

In case of an electrochromic lens, the transmission coefficient of the lens depends on a voltage delivered to the lens. The calculation module 303 can, for example, comprise a conversion table associated with different values of the voltage applied to the lens with the transmission coefficient of the lens.

In another embodiment, we measure directly the amount of front light transmitted by the lens and reaching the first light sensor 302-a. This amount can be measured using, for example, a sensor oriented toward the lens or directly integrated on the lens ("chip-on-lens" sensor). In this case, P_trans is measured through the active lens, and the amount of backlight is determined as previously directly from P_trans.

Similarly, if the reflective part 302-b is an active mirror, its reflection coefficient will be determined and taken into account in the calculation.

Furthermore, in the embodiment described in FIG. 7-b, the first light sensor 302-a is located in a slanted hole of the arm A1 and oriented toward the eye or the skin of the user. In this embodiment the skin or the eye of the user is also used as a reflective part in addition to the reflecting part 302-b (reflecting part that can be the lens itself). In these embodiments, the calculation module 303 or the optical device 302 also uses the reflection coefficient of light on the skin or the eye of the user (Refl_user) to determine the amount of light received on the skin or the eye. This determination of the reflection coefficient can be obtained thanks to a calibration made by the optician or another eye care professional, or a selection of a Fitzpatrick skin type via an application (image selection or camera picture and analysis).

In this embodiment the light received by the light sensor 302-a comprises reflected backlight and transmitted front light.

$$P\_R = P\_Trans + Refl * Refl\_user * P\_Back$$

where:

P_Trans is the amount of front light reaching the first light sensor 302-a

P_R is the amount of light received by the first light sensor 302-a

Refl is the reflection coefficient of the reflecting part 302-b reflecting the backlight toward the first light sensor 302-a Refl_user is the reflection coefficient of light on the skin or the eye of the user P_Back is the amount of backlight When the light sensor 302-a is configured to have a field of view matching the skin or the eye of the user, the calculation module 303 is configured to use the following equations:

$$P\_Trans = P\_Front * Trans * Refl\_user$$

$$P\_Back = (P\_R - P\_Trans)/(Refl * Refl\_user)$$

Where:

P_Front is the amount of front light received by the second light sensor 302-c, Trans is the transmission coefficient of the lens placed in the vicinity of the first light second sensor 302-a and impacted by the front light;

P_R is the amount of light received by the second light sensor 302-a,

Refl_user is the theoretical reflection of the part of the skin or the eye in the field of view of the first light sensor 302-a Refl is the reflection coefficient of the reflecting part reflecting the backlight toward the first light sensor 302-a P_back is the amount of backlight.

In an embodiment, the calculation module 303 is configured to determine practical reflection of the skin or the eye by dividing the amount of light P_R received from the first light sensor 302-a by the amount of light transmitted through the lens P_Trans:

$$Refl\_practical = P\_R/P\_Trans$$

If the practical reflection Refl_practical is equal to the theoretical reflection Refl_user therefore the amount of backlight is null.

In another embodiment, the first light sensor 302-a is configured to measure the light reflected by two different areas of the skin or the eye of the user. On one area the whole light is received (backlight and front light). It depends on the reflection of the lens and the reflection of the skin or eye of the user. On a second area, a calibrated light is received. It corresponds to the backlight reflected by a specific part of the lens, which reflection is calibrated and fixed, and by the skin or the eye of the user, and the transmitted front light. This area has a reflection coefficient Rcal linked to a specific mirror part (Highly Reflective HR coating, holographic mirror and so on). The difference between these two measurements will allow the deduction of the luminosity of backlights. It is also possible to use a part of the lens, which has a low reflection coefficient (Anti-Reflective AR coating, Rcal~0) and the level of luminosity corresponds only to transmitted light and to the reflection of the skin or eye of the user.

In an embodiment the eye tracker allows the determination of a gaze axis of the user and the calculation module 303 is configured:

to determine an intersection point of a lens of the optical device and the gaze axis, to determine a reflection coefficient associated with the intersection point, to determine the amount of the backlight received also using the reflection coefficient associated to the intersection point.

The calculation module 303 can also be configured to determine a transmission coefficient associated with the intersection point. The amount of the backlight received is also determined using the transmission coefficient associated with the intersection point.

The parameters (wavelength range of detection, field of view, nature (analog or numeric)) of the first light sensor 302-*a* depends on the type of material used to reflect the backlight and the geometrical configuration of the reflecting part 302-*b*.

When the backlight is reflected on the reflecting part 302-*b* of the optical device 302, the wavelength range is given mainly by the ambient light spectrum and also by the reflection spectrum of this part. Furthermore, the reflection spectrum of the reflective part can also be reciprocally determined by the detection spectral range or the spectral range of interest for the application.

When the backlight is reflected on the skin or the eye of the user the parameters depend on the characteristics of the skin and the eye, but also of the lens, especially its transmission spectrum. In this case the ambient light spectrum is also taken into account.

In an embodiment, the light sensor 302-*a* and the reflecting part 302-*b* are configured to respectively determine the amount of received light in a specific spectral range and reflect this specific spectral range. Furthermore, the lens is configured to not transmit or at least highly filter this specific spectral range. This spectral range can be a spectral range on which the light is harmful to the user (for example UV or blue light).

In other words, we can also make the measurements in a spectral range that is not transmitted by the lens.

The spectrum of reflection of the reflecting part 302-*b* will determine a detection range of the first light sensor 302-*a*. If the reflecting part 302-*b* is part of the lens (L1 or L2) that has a ultra violet protection through its nature or a coating (AR coating for example), UV light below 400 nm cannot pass through the lens and cannot be reflected by the lens and thus cannot be used for transmission or reflection measurements. In this case, it is advantageous to add an additional UV mirror allowing the use of UV reflection to the sensor and avoiding the reflection toward the eye.

When the reflective part 302-*b* is a holographic mirror (also used for augmented reality or refraction applications) the reflection will occur in visible range. The wavelength range of measurements of the first light sensor 302-*a* matches with the mirror's characteristics. It is advantageous to use at least two wavelength ranges: one for the ambient light influence and one for the specific wavelength. This allows avoiding perturbation to the view of the user, especially if the reflection is close to the maximum of eye's sensitivity.

The addition of a near-infrared mirror on the reflecting part 302-*b* allows the use of first light sensor 302-*a* configured to determine reflected NIR light. Using a near-infrared mirror allows having a specific mirror that does not disturb the vision through the lens. It can be a holographic mirror for example that concentrates the reflected light on the light sensor 302-*a*.

The spectrum of reflection of the eye is represented in FIG. 8. This spectrum shows that lights before 400 nm, around 1000 nm or after 1200 nm are reflected by the eye.

For near Infrared (NIR), from 800 to 1700 nm, two types of light sensor can be used. One type is silicon (Si) photodiodes. The range of detection is then 200-1200 nm, with low efficiency at the extremities and a maximum of efficiency from 800 to 1000 nm. One other type is Indium Gallium Arsenide (InGaAs) photodiodes that detect from 800 to 1700 nm. The Si photodiode has also the advantage of being more integrated and common than Indium Gallium Arsenide (InGaAs) photodiodes.

For ultraviolet range, the first light sensor 302-*a* can be a silicon carbide (SIC) photodiode. The range of detection of the silicon carbide (SiC) photodiode is 215 to 330 nm. This type of photodiode has the advantage of being easy to integrate in the first optical device 302.

For visible range, Si photodiodes or ambient light sensors (ALS) can be used. Ambient light sensors are Si photodiodes with a photopic filter to simulate human vision. We can also use photovoltaic cells that are a kind of Si photodiode. Photovoltaic cells are generally used as energy providers. However, as the produced voltage increases when the incoming light increases, the photovoltaic cells can be used as light sensors. One advantage of using photovoltaic cells for light measurement is the possibility to produce electricity at the same time. This electricity can be used to manage the transmission of the electrochromic lens or to charge the battery of the eyewear at the same time.

The FIG. 9 represents the spectrum of reflection of the skin. This spectrum differs with the color of the skin. A pigmented skin is less reflective in visible range than a fair one. The maximum of reflection is close to 1000 nm. The useful wavelength range is the visible one and/or the near infrared one.

The ambient outdoor light is mainly linked to the sun during the day. For sunny or cloudy days, the light contains UV, visible and NIR ranges of wavelengths.

The spectra of indoor lights can be different. A possibility is to stop the automatic function of the electrochimic lens inside and only propose a manual mode if the user prefers that his eyeglasses stays clear inside. But if the aim is to propose an automatic mode inside for electrochromic lens or augmented reality eyewear, the variety of artificial lights has to be taken into account. When the indoor light is created by incandescent or halogen light sensors sensitive to near infrared light are appropriated.

In some embodiments the wavelength range of the first or second light sensor is multifactorial and can depend on the aim of the control of the active transmission and/or reflection coefficient. In some embodiments we can combine different wavelengths to improve the efficiency of the detection of the backlight.

Si photodiodes have classically an acceptance angle of 120°. It is the case of ALS, for example. The wanted acceptance angle depends on the embodiment of measuring the backlight. To modify the acceptance angle of the cameras and photodiodes optics can be used, for example a lens placed before the cameras and photodiodes. For example, the photodiodes can be equipped with a lens to reduce their acceptance angle to 40°. A shorter angle of 10° can be achieved with lenses small enough to integrate the sensor. An advantage of low acceptance angle is to avoid parasitic light.

Another possibility is to integrate the sensor in the branch, parallel to the branch and to use a slanted hole to aim at the skin of the wearer. To increase the amount of collected light, deflection optics, like small prisms or holographic deflectors, can be used.

Once the amount of backlight is determined, the optical device 302 can be configured to modify some of its function according to this amount. For example, this amount can be used to configure the electrochromic lens. Furthermore, this configuration can also depend on the situation. Different kinds of active lenses can be configured, for example electrochromic lenses with active transmission and/or active reflection, active filters, like electrochromic or active holographic filters, or active mirrors like active holographic mirrors, and so on.

In some embodiments, this configuration is also realized based on a ratio between the front light and the backlight.

In embodiments, increasing the background luminance/field luminance ratio is used to decrease nuisance from background light.

When the optical device 302 comprises transmission electrochromic lens, when the amount of backlight is almost null, the electrochromic lens can be configured to have a predetermined tint. In some embodiments this predetermined tint depends on the amount of front light received to provide visual comfort or to prevent glare.

When the amount of backlight is not null, the tint of the electrochromic lens is modified to be adapted to this amount of backlight. This adaptation allows the improvement of the contrast of what the user sees through the lens. To realize this determination:

we determine a ratio between backlight reflected toward the eye (from backlight measurement and reflection property of the lens) and the light coming from front side we adjust tint based on this ratio: if the ratio is too high, we reduce the tint to reduce ratio, if the ratio is ok, we may keep the tint as it is.

To be acceptable the backlight should not be superior to half of the front light therefore the tint of the electrochromic lens can be modified to modify the amount of front light and so respect this ratio.

When the lens is an electrochromic mirror lens, the management of the reflection value of the lens allows that the reflection of the lens induces glare of the user. More precisely the higher the amount of backlight is, the lower the reflection of the lens should be. In other words, the management of the reflection of the mirror avoids a strong reflection when the main light is behind the user.

When both the reflection and the transmission of the lens can be configured, the same ratio between front light and backlight is used to realize this configuration.

Lens can be a holographic mirror that can also be used as aesthetic mirror. To avoid disturbance to the user, the holographic mirror can be decreased or disabled when the amount of backlight is above a threshold. This will also avoid a glare of the user. It also be useful for active filters, if the action of the filter is not necessary during the period of strong exposition to backlights, or if the filter action is too visible or disturbing (coloured reflection on the user's skin for example, not visible by the user himself but by someone looking at him).

When a holographic mirror is placed on the internal side of the optical device, for example along the concave side of the lens, this mirror can be configured to limit a part of the backlight, more precisely the harmful light, entering the eye of the user. UltraViolet, blue or near infrared light are examples of harmful lights. The holographic mirror can be designed and recorded to reflect the harmful light on a corner of the frame, or toward a sensor. This mirror can here be active and its reflection coefficient can increase or decrease in function of the backlight luminosity. In this case, the sensors used can have a central wavelength and a bandwidth linked to the ones of the lights we want to reflect.

Holographic mirrors can also be used to display information in front of the eye of the user. An active mirror can have a reflection coefficient depending on the ambient lights, to correctly balance the display light vs the ambient light and more precisely the backlight. Increasing the mirror reflection in function of the backlight and the front light can help to improve the visibility of the virtual image without increasing the display luminosity. In addition to the active mirror effect, a transmissive electrochromic lens can help to improve the visibility of the virtual image without increasing the luminosity of the display source DISP. If there is some backlight, it can be necessary to balance both the electrochromic transmission and the mirror reflection, and also to increase the display source luminosity to improve the visibility of the virtual image. This management has to take into account the comfort of the user, the possibility of glare, and the ocular security with coherent and incoherent sources of light for the display. This management of the electrochromic transmission and the active holographic mirror reflection can be extended to the case of active support of the virtual image SCR, in the case of active diffractive optics, active partially reflective mirrors, and so on.

The active holographic mirror has at least one bandwidth and one central wavelength adapted to the display used to show the information. If the display is polychromatic, the active holographic mirror will have as many central wavelengths and bandwidths as the display. To configure the holographic mirror, we can use the following method:

Initially, the display has a luminosity Ldisp and the mirror has a coefficient of reflection Rhm. The optical device 302 does not offer yet a good contrast and visibility of the virtual image by the user. The optical device 302 is equipped to measure the backlight and the front light, The ratio between the luminosity of the backlight reflected by the holographic mirror and the front light is calculated.

If the reflection is too important, the coefficient of reflection of the holographic mirror will be decreased and/or the transmission of the electrochromic lens (if the device is also equipped with a transmissive electrochromic lens) is increased to enhance the visual comfort of the user. If the user also needs to look at the virtual image, the intensity of the display can be modified to compensate for the decrease of contrast and holographic mirror reflection.

If the virtual image has no interest for the user, it can be switched off. An eye tracker module can be used to check if the user is looking at the virtual information or not.

In case of augmented reality eyeglasses, the amount of determined backlight can be used the following way.

Here, we have a holographic mirror, used to reflect virtual images provided via an image generating system DISP (2D display, LFD, SLM . . . ) in the eyewear temple. The holographic mirror is designed to have narrow band reflection, corresponding to the R/G/B spectrum provided by the image generating system.

A variable transmission electrochromic lens is included, to reduce intensity of front side light, and so increase contrast of virtual image. A camera is located close to the image generating system and retrieves images of the user eye. More particularly, we can use reflection of light coming from the front/back side on the eye cornea. The virtual image is provided with a generating system having intensity adjustment property.

In a nutshell, both the electrochromic tint and the intensity of the image generating system are modified to provide good contrast for virtual images. We get a first image of the eye cornea, that will provide reflection of light coming from the front side and back side.

$$Light\_cornea = Reflect\_front\_side + Reflect\_back\_side.$$

where:

Light_cornea is the amount of light measured on the cornea,

Reflect_front_side is the amount of front light reaching the first light sensor 302-*a* and reflected by the cornea, Reflect_back_side is the amount of reflected backlight received by the first light sensor 302-*a* from the lens and the cornea.

Light_cornea is for example measured in gray level 8 bits. The intensity of corneal light gives us (knowing corneal reflection coefficient Rcornea) the intensity of light coming from front side (Ifront_side) and back side (Iback_side), when the image generating system is off:

$$I(Lux) = Ifront\_side + Iback\_side = Light\_Cornea/Rcornea * \alpha,$$

with $\alpha$ a coefficient parameter coming from the camera design (sensor specifications), that can be determined experimentally or from calculation. Furthermore, to provide a correct contrast for virtual image we can compare/with the Idisplay. Idisplay being the intensity of the light provided by the image generating to the eye. The ratio Idisplay/I may be for instance more than 10, 20 or 40 to provide good contrast. If the ratio is correct, we realize no modification. If the ratio is not correct, we need to determine a modified tint of the electrochromic lens and a modified Idisplay to increase contrast.

We determine Ifront_side and Iback_side, the following way:

we adjust the EC tint, for instance we decrease the transmitted light by an amount of Trans (starting here from Trans=100%). Now I is modified to I':

$$I' = Trans * Ifront\_side + Iback\_side$$

So comparing I and I', we can get Ifront_side and Iback_side:

$$Ifront\_side = (I' - I)/(Trans - 1) \text{ and } Iback\_side = I - Ifront\_side$$

If we want to achieve a ratio 20 for Idisplay/I, we need to have:

$$I' = TransF * Ifront\_side + Iback\_side < 0.05 * IdisplayF$$

with TransF being the target transmission and IdisplayF the target display intensity.

To achieve this, we may have:

$$Iback\_side < 0.025 * IdisplayF \text{ and}$$
$$TransF * Ifront\_side < 0.025 * IdisplayF$$

To achieve this we may have:

$$IdisplayF = Iback\_side/0.025$$

If current Idisplay<IdisplayF, Idisplay is increased to reach IdisplayF. If current Idisplay>IdisplayF, we can keep Idisplay as it is.

The Target Transmission is then:

$$TransF = 0.025 * IdisplayF/Ifront\_Side$$

If TransF is superior to 100%, we do not need to tint the electrochromic lens, meaning that Ifront_side is low. If TransF is inferior to 100%, we need to tint the electrochromic lens accordingly.

So we have determined both the electrochromic tint and display intensity to achieve good contrast for virtual image. Doing such allows also to limit the intensity of the display to what is required.

The invention claimed is:

1. A system comprising:

an optical device intended to be worn by a user; and circuitry, the optical device comprising a light sensor and a reflecting part, the light sensor being located in an internal side of the optical device and in a vicinity of a front part of the optical device, the light sensor being configured to determine an amount of light that the light sensor receives, the circuitry being configured to determine an amount of backlight received by the optical device using the amount of light received by the light sensor, and the reflecting part being configured to reflect the backlight.

2. The system according to claim 1, wherein the reflecting part is localized in an internal side of the front part of the optical device, and a field of view of the light sensor is configured to match with the reflecting part.

3. The system according to claim 2, wherein the reflecting part is a holographic mirror configured to reflect at least one frequency of the light, and the light sensor is configured to determine the amount of light that the light sensor receives on only the at least one frequency.

4. The system according to claim 2, wherein the reflecting part has a controllable reflection coefficient, the light sensor is configured to determine:

a first amount of light received when the reflecting part has a first reflection coefficient, and a second amount of light received when the reflecting part has a second reflection coefficient, the first reflection coefficient is different from the second reflection coefficient, and the circuitry or the optical device is also configured to subtract the first amount of light received by the light sensor and the second amount of light received by the light sensor.

5. The system according to claim 2, wherein the reflecting part is a first reflecting part, the optical device comprises a second reflecting part, a reflection coefficient of the first reflecting part is different from a reflection coefficient of the second reflecting part, the optical device or the circuitry is configured to determine:

a first amount of light reflected by the first reflecting part, and a second amount of light reflected by the second reflecting part, or a subtraction of the first amount of reflected light and the second amount of reflected light, and the circuitry is also configured to determine the amount of backlight using the first amount of reflected light, the second amount of reflected light and/or the subtraction.

6. The system according to claim 1, wherein the light sensor is a first light sensor, the optical device comprises a second light sensor, the second light sensor is configured to determine:

an amount of front light received by the optical device, or an amount of the light transmitted by a lens of the optical device, and the circuitry is configured to determine the backlight using also the amount of front light received or the amount of the light transmitted by the lens.

7. The system according to claim 6, wherein the circuitry is configured to determine the backlight also:

by multiplying the amount of front light received by a transmission coefficient of the lens of the optical device and by subtracting the multiplication to the amount of light received by the first light sensor, or by subtracting the amount of the light transmitted by the lens to the amount of light received by the first light sensor.

8. The system according to claim 1, wherein a field of view of the light sensor is configured to match with a face of the user when the optical device is worn by the user.

9. The system according to claim 1, further comprising an eye tracker configured to determine a gaze axis of the user, the circuitry being configured:

to determine an intersection point of a lens of the optical device and the gaze axis, to determine a reflection coefficient associated to the intersection point, and to determine the amount of the backlight received also using the reflection coefficient associated to the intersection point.

10. The system according to claim 1, wherein an acceptance angle of the light sensor and/or a direction of detection of the light sensor is configured such that the light sensor mostly receives backlight.

11. The system according to claim 10, further comprising an eye tracker configured to determine a gaze axis of the user, the circuitry being configured to adapt the acceptance angle and/or the direction of the detection of the light sensor according to the gaze axis.

12. The system according to claim 10, wherein the acceptance angle is between 5° and 90°.

13. The system according to claim 1, wherein the optical device is an eyewear, the eyewear comprising a frame and an electrochromic lens, the frame comprising a front part and an arm, the front part and the arm being connected by a hinge, the light sensor being located in the internal side of the arm in the vicinity of the hinge, and the eyewear being configured to adapt a tint of the electrochromic lens according to the amount of backlight received.

14. The system according to claim 1, wherein the optical device corresponds to augmented reality glasses, the augmented reality glasses being configured to display a picture to the user, the augmented reality glasses being configured to adapt a contrast of the picture based on the amount of backlight received.

15. The system according to claim 1, wherein the circuitry is included in the optical device or in a mobile device.

16. The system according to claim 10, wherein the acceptance angle is between 20° and 70°.

17. A system comprising:

an optical device intended to be worn by a user;

an eye tracker configured to determine a gaze axis of the user; and circuitry, the optical device comprising a light sensor, the light sensor being located in an internal side of the optical device and in a vicinity of a front part of the optical device, the light sensor being configured to determine an amount of light that the light sensor receives, the circuitry being configured to determine an amount of backlight received by the optical device using the amount of light received by the light sensor, and the circuitry being configured:

to determine an intersection point of a lens of the optical device and the gaze axis, to determine a reflection coefficient associated to the intersection point, and to determine the amount of the backlight received also using the reflection coefficient associated to the intersection point.

18. A system comprising:

an optical device intended to be worn by a user; and circuitry, the optical device comprising a light sensor, the light sensor being located in an internal side of the optical device and in a vicinity of a front part of the optical device, the light sensor being configured to determine an amount of light that the light sensor receives, the circuitry being configured to determine an amount of backlight received by the optical device using the amount of light received by the light sensor, wherein the optical device is an eyewear, the eyewear comprising a frame and an electrochromic lens, the frame comprising a front part and an arm, the front part and the arm being connected by a hinge, the light sensor being located in the internal side of the arm in the vicinity of the hinge, and the eyewear being configured to adapt a tint of the electrochromic lens according to the amount of backlight received.

* * * * *